U. S. EBERHARDT.
SCRAPING MEANS FOR USE WITH ROTATING MEMBERS.
APPLICATION FILED FEB. 10, 1920.

1,369,637.

Patented Feb. 22, 1921.

INVENTOR
Ulrich Seth Eberhardt
BY
ATTORNEY

UNITED STATES PATENT OFFICE.

ULRICH SETH EBERHARDT, OF MAPLEWOOD, NEW JERSEY, ASSIGNOR TO NEWARK GEAR CUTTING MACHINE CO., OF NEWARK, NEW JERSEY, A CORPORATION OF NEW JERSEY.

SCRAPING MEANS FOR USE WITH ROTATING MEMBERS.

1,369,637.     Specification of Letters Patent.     Patented Feb. 22, 1921.

Application filed February 10, 1920. Serial No. 357,661.

*To all whom it may concern:*

Be it known that I, ULRICH SETH EBERHARDT, a citizen of the United States, and a resident of Maplewood, in the county of Essex and State of New Jersey, have invented certain new and useful Improvements in Scraping Means for Use with Rotating Members, of which the following is a specification.

The invention relates to an attachment or scraping means for use with rotating members mounted in suitable bearings, as the work-tables of lathes, boring mills, gear cutting machines and the like.

It has for its object a device of this character which may be conveniently secured to such work-table or like member and which will effectively remove the cutting chips and other foreign material which might otherwise tend to accumulate. It is well known that such rotating work tables ordinarily become covered with chips and dust which tend to work in between bearing surfaces and produce scoring of the said surfaces. These accumulations of debris also absorb oils and lubricants from the bearing surfaces, causing the latter to become dry at and near their periphery and also causing seizing or cutting of the said surfaces. The device or attachment forming the subject of the present invention effectively removes the chips and dust, is easily applied to new or existing work tables and is equally efficient in its operation for either direction of rotation of the work table.

In the drawings, Figure 1 is an elevation, partly in section, of the invention as applied to a work table.

Similar characters of reference designate corresponding parts throughout the several views.

Figure 1:
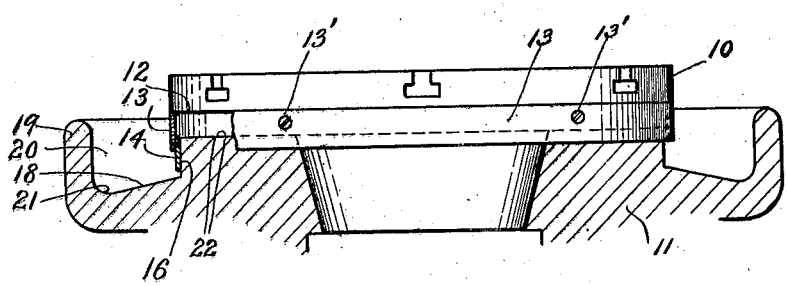
Figure 2:
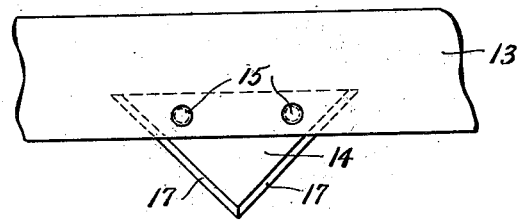
Fig. 2 is a front view of the scraper.
Figure 3:
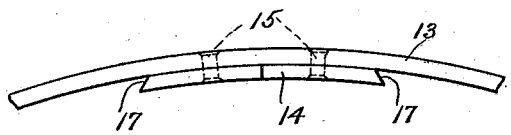
Fig. 3 is an underneath view of the same.

Referring to the drawings, the novel device is shown as applied to a circular work table 10 mounted in a bearing member or housing 11, the periphery of the table being preferably formed with a shoulder 12 designed to receive a band 13 which may be secured thereto as by screws 13'. This band carries a triangular or V-shaped scraper 14 which is suitably secured to the inner over-hanging edge thereof, preferably by rivets 15. The inner surface of the scraper member 14 abuts and is concentric with a cylindrical portion 16 of the housing 11, the member being formed with beveled edges 17 upon the two sides forming the V.

The cylindrical portion 16 of the housing 11 preferably meets a conical surface 18 of said housing which terminates in a wall or rim 19 forming with the surfaces 16 and 18 a channel portion 20 for holding cutting chips.

The deepest part 21 of the channel 20 is preferably formed at the outer edge of the conical surface 18. As heretofore constructed, the coacting faces 22 of the bearing surfaces of the table 10 and housing 11 have been left exposed to the accumulations of cuttings and dust.

By the use of the novel device embodying the invention, this portion is automatically protected and maintained clean during operation, as follows:

As the table 10 rotates, the wide overhanging band 13 rotates with it and carries the scraper 14 along around the cylindrical portion 16, thus causing edges 17 to wedge in between accumulations of foreign matter and said portion 16. At the same time, due to the shearing action of the V-shaped edges 17, the accumulations are forced down and away from the coacting surfaces 22. As accumulations reach the apex of the V-shaped scraper 14 they fall upon the conical surface 18 and are carried by force of gravity toward the deep part 21 of the chip groove 20. It is obvious that the V-shaped scraper 14 will operate equally efficiently in either direction.

I claim:

1. In combination, a bearing member, a work table mounted therein, and a scraper secured to said table, the bearing member having a conical surface formed thereon and descending as its diameter increases and adapted to cause material falling thereon to seek the deepest portion of said conical surface as the same is removed by the scraper.

2. In combination, a bearing member, a work table mounted therein and having a circular shoulder formed thereon, a band secured to said shoulder and over-hanging a cylindrical portion formed on the bearing member, and a V-shaped scraper secured to said band, concentrically with said bearing member and extending over the said cylindrical portion thereof to scrape same, said bearing member having a conical surface formed thereon and descending as its diameter increases and adapted to cause material falling thereon to seek the deepest portion of said conical surface as the same is removed by the scraper.

Signed at Newark in the county of Essex and State of New Jersey this 5th day of February A. D. 1920.

ULRICH SETH EBERHARDT.